Oct. 10, 1933.  A. LOPPACKER  1,929,699

AUDION VALVE STRUCTURE

Filed April 23, 1930

Albert Loppacker INVENTOR

BY Frank J. Kent ATTORNEY

Patented Oct. 10, 1933

1,929,699

UNITED STATES PATENT OFFICE 1,929,699

AUDION VALVE STRUCTURE

Albert Loppacker, Bloomfield, N. J.

Application April 23, 1930, Serial No. 446,492
Renewed August 9, 1932

4 Claims. (Cl. 250—27.5)

My invention relates to audion or thermionic valves and especially to new and improved features of construction or arrangement of parts thereof, including a plate, plate supporting means, and above the plate, a spacing insulator for certain of the valve elements or element supports.

A principal feature of the invention is a hollow plate, adapted to enclose the filament and grid (or other elements), in one or two parts and shaped to provide vertical side flanges having vertical, flattened and laterally elongated tubular formations to receive the main supporting rods, allow for reasonable variations in rod spacing, and facilitate or increase the effectiveness of the welding operations by which the plate is connected to the rods. To secure the insulating support or spacer located above the plate, retainers or plugs are provided, passing through the insulator or spacer and entering the tubular plate formations and secured therein by welding.

To still further increase the effectiveness or efficiency of the weld connections, the main supporting rods may also be flattened at opposite sides where they engage walls of the flattened tubular plate formations, thus increasing the area of contact and strength of the welds.

The characteristics and advantages of the invention are further sufficiently explained in connection with the following detail description of the accompanying drawings, which show representative embodiments. After considering these examples, skilled persons will understand that many variations may be made without departing from the principles disclosed, and I contemplate the employment of any structures that are properly within the scope of the appended claims.

Figure 1:
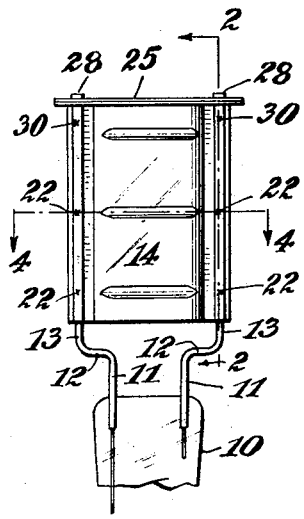
Fig. 1 is a side elevation of essential inner parts of an audion valve embodying the invention in one form.
Figure 2:
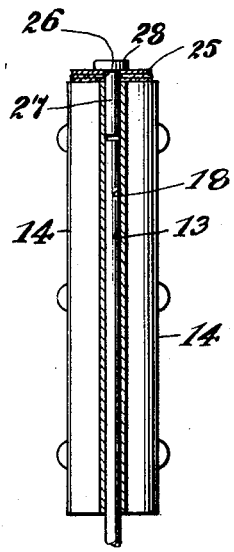
Fig. 2 is a section at 2—2, Fig. 1, enlarged.
Figure 3:
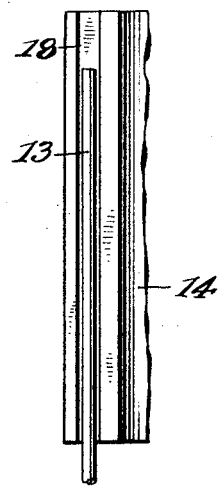
Fig. 3 is a fragmentary elevation of a portion of one of the plate halves and a supporting rod.

In Fig. 1, 10 is a press, or interior glass support for the tube elements, including the parts, filament and grid or grids. Showing of such elements except the plate and plate supports is omitted, since the invention relates principally to the plate, plate supporting means or arrangement and means or arrangement for supporting an insulator or spacer on or above the plate.

Main supporting wires or rods 11 are inserted in the press. These rods near the press have horizontally offset portions 12 to provide for the proper separation of the upper, parallel, vertical portions 13.

Figure 4:
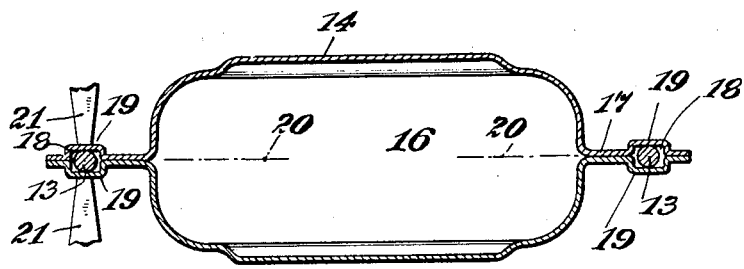
Fig. 4 is a section at 4—4, Fig. 1.
Figure 5:
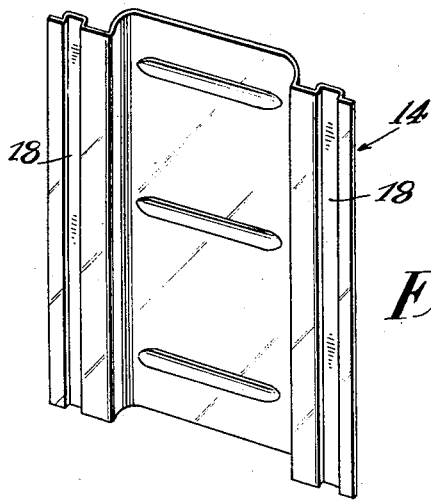
Fig. 5 is a perspective view of one of the plate halves.

The plate 14 may if desired be in one piece folded at one of the side edges or may be, as shown, in two sections or halves 14ª, one of which is shown in perspective in Fig. 5. These halves may be identically formed so that when properly placed together, as shown in Figs. 1 to 4, the complete plate has the main or central opening 16 to enclose other active elements of the valve, and contacting vertical side flanges 17, in each of which is formed a vertical tube 18 to receive one of the supporting rods 13. These tubular formations have opposite flat faces 19 and are dimensioned to approximately or closely engage the rods at opposite sides, but are elongated laterally or in the direction of an axis indicated by the dot-and-dash line 20, Fig. 4, so that in this direction the tubular passages are substantially wider than the rod diameter.

Thus, when the plate halves are brought together with the rods enclosed in the tubular formations 18 the spacing of the rods in the direction of the axis 20 may vary considerably, thus allowing for small but material variations in the spacing of the rods incident to the ordinary methods of manufacture or assembly.

When the plate sections are assembled in relation to the supporting rods, as shown in Fig. 4, welding electrodes such as 21 are applied to the opposite flat faces 19 of the tubular formations 18 at various points lengthwise of these tubes to form spot welds 22, Fig. 1. The electrodes have flat ends as shown, and the flat faces of the tubular formations cooperate with these flat electrode ends to provide ample areas of contact, securing effective heat transfer and substantial welds to the rounded faces of the supporting rods.

Figure 6:
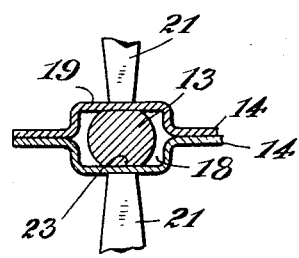
Fig. 6 is a fragmentary section similar to Fig. 4, showing a modification.

As a variation or improvement, opposite faces of the rods 13 may be flattened as at 23, Fig. 6, and these flat faces engaging the inner faces of the flattened portions 19 of the tubular formations provide substantial areas of contact instead of merely line contact as in Fig. 4, so that the welds connecting the plate members and the rods may be of ample area and security.

It is desirable to secure above or at the top of the plate an insulating or spacing and supporting member such as the mica strip 25. This has intermediate its ends holes properly spaced to receive supporting rods or wires for various active valve elements located within the plate. This supporting or insulating member is not illustrated in detail, since its particular form or arrangement may vary in accordance with the tube elements or the arrangement of their supporting members. The insulating member has near its ends holes 26 to receive the stem portion 27 of plugs which also have heads 28 engaging the upper face of the insulator. The stems 27 are of the same diameter as the supporting rods 13, and are inserted in the upper ends of the plate tubular formations and secured in position by spot welds, such as 30, Fig. 1.

The described general construction and arrangement of the plate and its supporting rods thus also provides for the placing and securing of the insulating or spacing member 25 in a simple, convenient and effective way.

The general plate and rod arrangement also permits variations in the mode of assembling, thus interior elements and their supports may be put in position before the plate sections are applied and secured, and the supporting or insulating member 25 may be positioned and secured practically as a part of the operation of applying and securing the plate sections, or after the plate sections are applied to the supporting rods and welded in position.

I claim:—

1. In an audion valve or the like, supporting rods extending upward from the press, and a hollow plate structure comprising tubular side formations containing the rods and engaging opposite faces of the rods, the faces of the tubular formations engaging the rods being flattened to cooperate with flat-ended welding electrodes, the faces of the rods engaging the flat faces of the tubular formations being flattened to provide increased contact areas.

2. In an audion valve or the like, supporting rods extending upward from the press, a hollow plate structure comprising tubular side formations containing the rods and engaging opposite faces of the rods, the faces of the tubular formations engaging the rods being flattened to cooperate with flat-ended welding electrodes, the faces of the rods engaging the flat faces of the tubular formations being flattened to provide increased contact areas, and spot welds connecting the flat faces of the tubular formations to the similar faces of the rods.

3. In an audion valve or the like, supporting rods extending upward from the press, and a hollow plate adapted to enclose other valve elements, the plate consisting of two sections having at the side edges cooperating formations providing tubes enclosing the rods, the tube walls engaging rod faces being flattened, the rod faces engaging said flat tube faces being also flattened to provide increased contact and weld areas.

4. In an audion valve or the like, supporting rods extending upward from the press, and a hollow plate adapted to enclose other valve elements, the plate consisting of two sections having at the side edges cooperating formations providing tubes enclosing the rods, said tubes being laterally wider than the rods to provide for reasonable variations in rod spacing, and the tube walls engaging rod faces being flattened for increased contact area with welding electrodes, the rod faces engaging said flat tube faces being also flattened to provide increased contact and weld areas.

ALBERT LOPPACKER.